United States Patent
Waters

[11] Patent Number: 5,941,666
[45] Date of Patent: Aug. 24, 1999

[54] DUNNAGE SECUREMENT DEVICE

[76] Inventor: Donald R. Waters, 186 Waters Rd., Beech Island, S.C. 29841

[21] Appl. No.: 09/213,693

[22] Filed: Dec. 17, 1998

[51] Int. Cl.[6] ........................................... B06P 7/08
[52] U.S. Cl. ................... 410/100; 410/34; 410/97; 410/103
[58] Field of Search .................. 410/34, 12, 97, 410/100, 103; 248/499; 254/223, 266, 277, 323, 376, 380, 243; 24/68 CD, 265 CD

[56] References Cited

U.S. PATENT DOCUMENTS

| | | | |
|---|---|---|---|
| 3,428,331 | 2/1969 | Morgan et al. | 410/100 |
| 3,848,889 | 11/1974 | Sharrow. | |
| 3,957,285 | 5/1976 | Schlaeger | 410/100 |
| 4,036,476 | 7/1977 | Douce et al.. | |
| 4,168,668 | 9/1979 | Grube et al.. | |
| 4,174,119 | 11/1979 | Biles | 410/103 |
| 4,229,131 | 10/1980 | Hague. | |
| 4,842,236 | 6/1989 | Yonts. | |
| 4,884,924 | 12/1989 | Nachtigall et al. | 410/103 |
| 4,900,203 | 2/1990 | Pope | 410/100 X |
| 5,156,506 | 10/1992 | Bailey | 410/100 |
| 5,314,275 | 5/1994 | Cottrell et al.. | |
| 5,542,798 | 8/1996 | Rawdon et al.. | |
| 5,800,105 | 9/1998 | Stump | 410/103 |

FOREIGN PATENT DOCUMENTS 869480   1/1942   France .................. 410/97

*Primary Examiner*—Stephen T. Gordon
*Attorney, Agent, or Firm*—Hinkle & Associates, P.C.

[57] ABSTRACT

A tie-down device (11) to hold tractor trailer dunnage (19) securely to the landing gear (15) of a trailer when the dunnage is not in use. The tie-down device includes a pawl and ratchet winding mechanism (13) having a securement strap (14) which wraps around the dunnage and hooks to an eye hook (38) which is resiliently mounted to a support member (33) to maintain tension upon the securement strap.

10 Claims, 3 Drawing Sheets

Fig_1

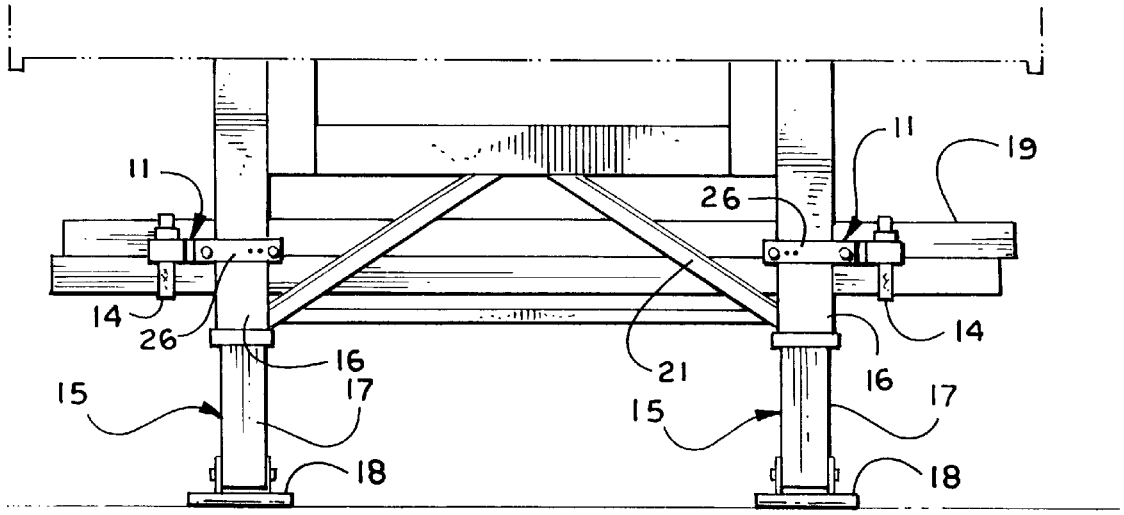
Fig_3A
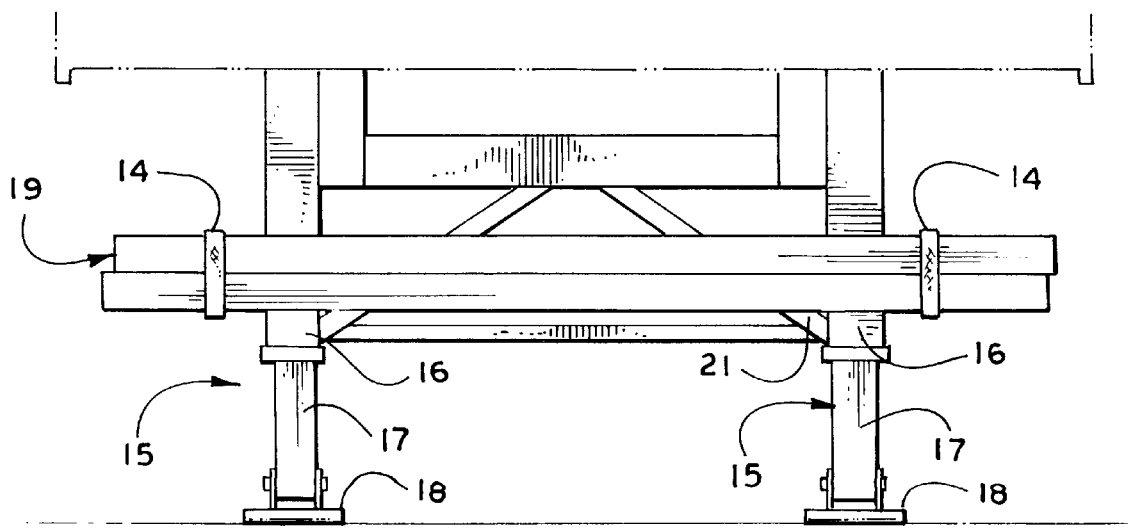
Fig_3B

DUNNAGE SECUREMENT DEVICE

BACKGROUND OF THE INVENTION

I. Field of the Invention

The present invention relates generally to the field of tie-down devices designed to tightly hold bulky materials on trailers and, more particularly, to a heavy duty fastening securement device which will safely and easily secure dunnage between the landing gear and landing gear bracing underneath flatbed truck trailers.

II. Description of the Related Art

Tie-down rollers and securement devices have long been utilized on flatbed trailers, and other types of trailers, for the purposes of securing a load to the flatbed trailer. Typically, when a load is placed upon a flatbed truck trailer, the load, in certain instances, may not be placed juxtaposed with the flatbed surface. Frequently, the load is maintained above the flatbed surface and supported on large timbers which may measure some eight (8) feet in length and will be in the neighborhood of four (4) inches square. Obviously, the sizes of the dunnage may vary from load to load depending upon the type of load which is to be supported. The problem comes when the flatbed trailer is unloaded and something must be done with the dunnage for the deadhead trip of the trailer back to the original location from where the load was initially loaded on the flatbed trailer. In the past, there has been many systems for maintaining the dunnage in a secure relationship to the flatbed trailer. In addition, if the trailer is not deadheading, the trailer may have a return load which does not require the dunnage for proper loading or may not require all of the dunnage to be utilized for a particular load. At this point, something must be done with the excess dunnage for the return trip.

In the past, there has been problems with proper securement of the dunnage on flatbed trailers and, in various states, the departments of transportation have suggested using rope or chain to secure the dunnage either to the flatbed trailer portion or to some other location such as the landing gears of the trailer. However, a problem normally occurs when securing the dunnage by using rope or chain, because such can be become loose during transport causing an obvious safety problem. To overcome the possibility of a rope or chain becoming loose, many truck drivers have used rubber bungy cords in the past, but in many jurisdictions, this type of securement device is not over-the-road legal.

It has been considered to utilize a tie-down racheting type of roller system to secure the dunnage, such as that shown in U.S. Pat. No. 5,314,275 issued to D. Michael Cottrell et al. However, such a device ultimately fails because it does not have a safety tensioning fastening means which will overcome any looseness that develops in the dunnage during the over-the-road travel time.

SUMMARY OF THE INVENTION

In accordance with the present invention and the contemplated problems which have and continue to exist in this field, the invention herein is so designed as to provide a dunnage securement device which will safely and easily secure dunnage between the landing gear and landing gear bracing underneath flatbed truck trailers. The invention generally envisions having a mechanism mounted to the landing gear of the flatbed trailer, and having a pawl and ratchet winding mechanism designed to tension a securing strap around the dunnage and to maintain the dunnage closely adjacent to the landing gear during all conditions of over-the-road travel. The winding mechanism also includes a pivoting hook arrangement cooperatively engaged with the securing strap to maintain a proper tension upon the dunnage, and to allow proper securing strap placement around the dunnage materials.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 3A is a vertical elevation view showing the front of a flatbed trailer with the dunnage materials secured to the landing gear of the trailer; and FIG. 3B is a vertical elevation view, similar to that of FIG. 3A, showing the rear view of the dunnage material attached to the landing gear of a flatbed trailer.

DESCRIPTION OF THE PREFERRED EMBODIMENT

Figure 1:
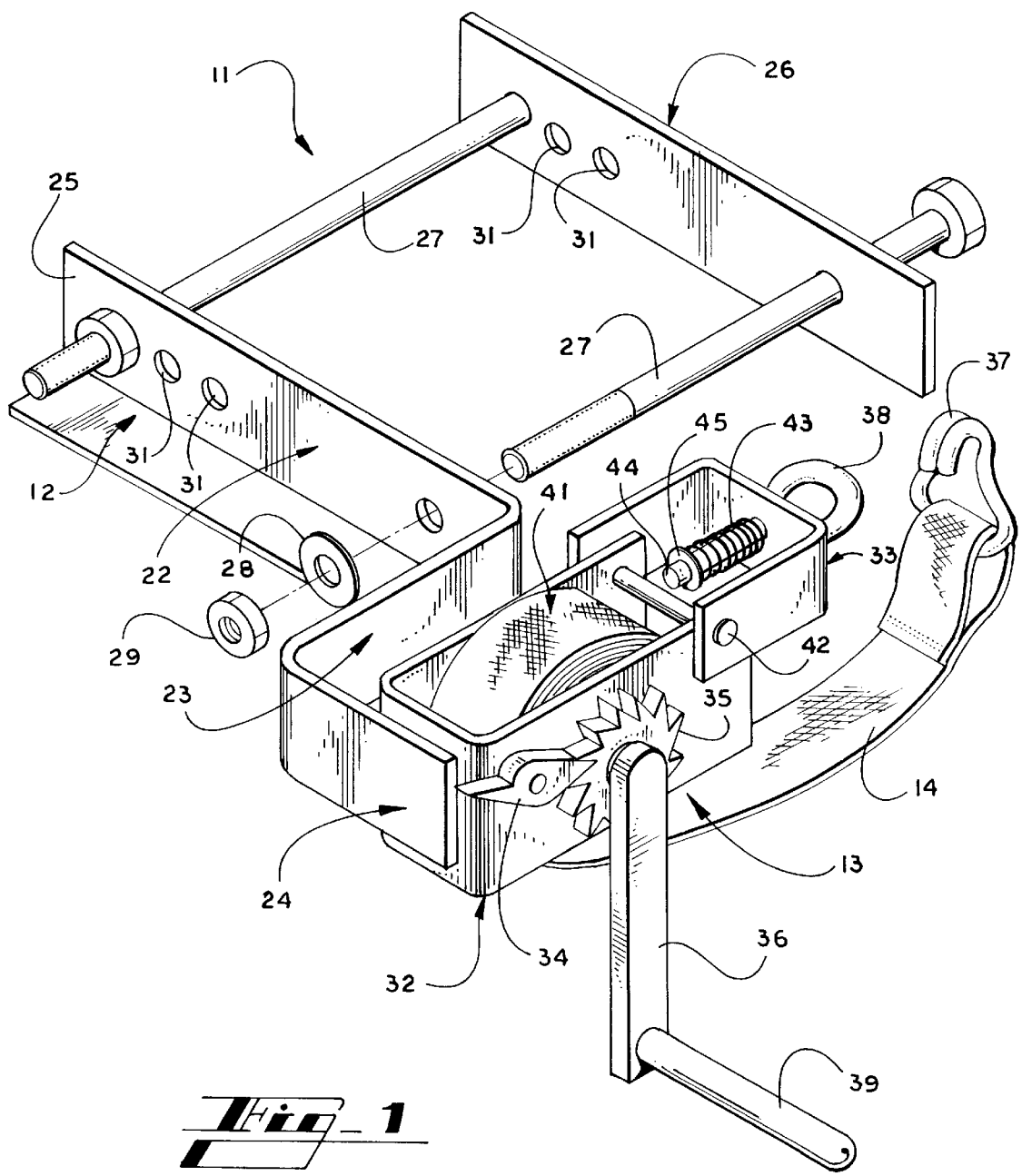
FIG. 1 is an overall exploded perspective view of the dunnage securement device of the present invention.

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIGS. 1 and 2. The dunnage securement device 11 generally comprises a mounting means 12, a winding mechanism 13 and a securing strap 14.

The mounting means 12 is designed to fit around the trailer landing gear 15, which is a common type of supporting member utilized on large trailers. The gear 15 typically includes an upper portion 16 and a telescoping lower portion 17 which terminates in a landing gear ground engaging foot 18. In this manner, the height of the trailer bed, with respect to either the ground or to the fifth wheel of the tractor, may be adjusted by telescoping member 17 into member 16.

Figure 2:
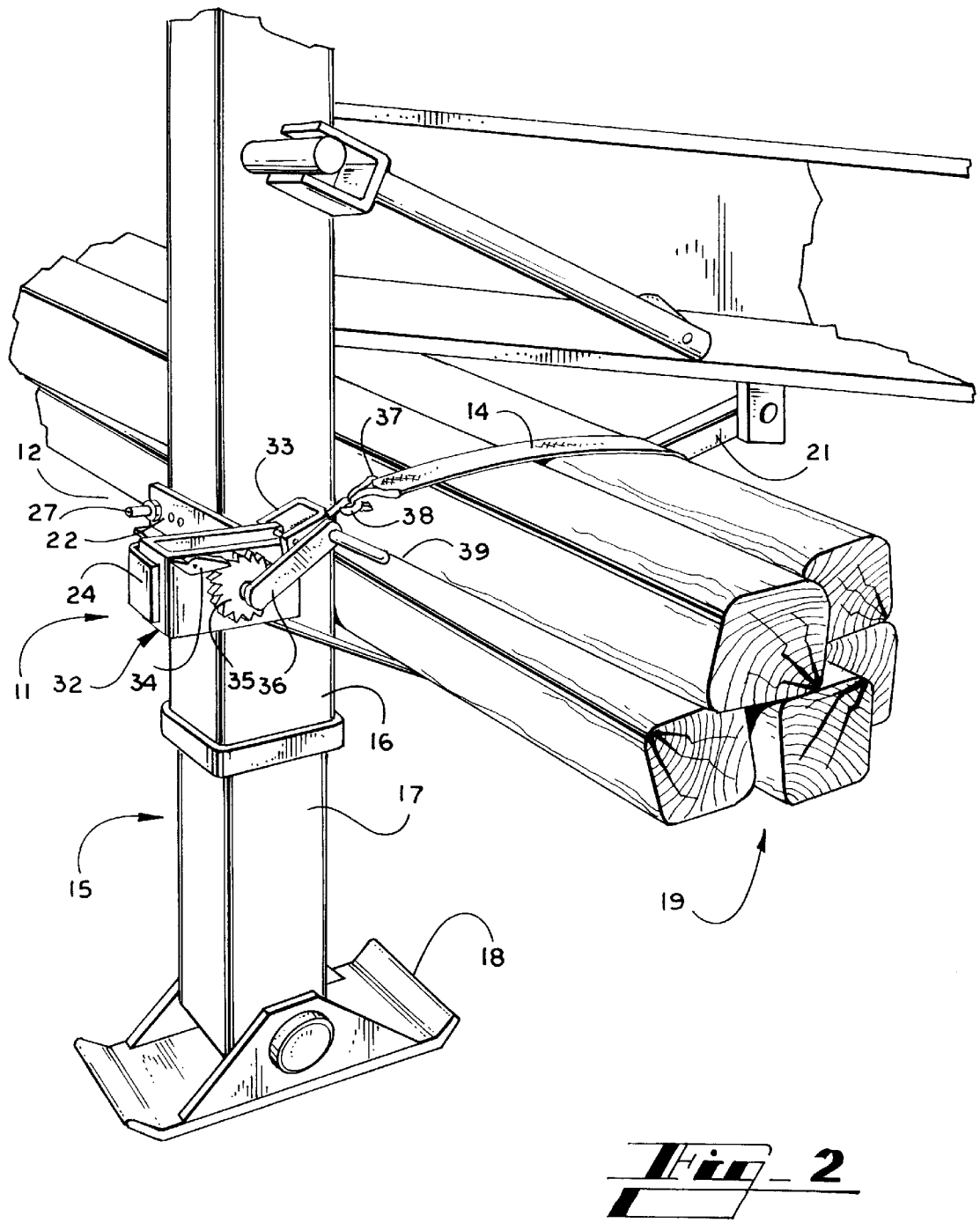
FIG. 2 is a perspective elevation view of the dunnage securement device attached to the landing gear of a flatbed trailer showing dunnage being secured thereto.

As can be seen in FIGS. 2, 3A and 3B, the dunnage 19 is secured against the landing gear 15, and is assisted in being maintained in position by trailer bracing member 21. Therefore, as can be readily observed, the dunnage 19 rests against landing gear 15 and is supported also by resting against bracing member 21.

The securement device 11 is mounted to landing gear 15 by the mounting means 12. The mounting means generally comprise a mounting bracket 22 of elongated flattened configuration which has an offset area 23 and a termination end 24, all of which project from the main frame attachment end 25. As can be readily observed when the securement device is in use, the mounting bracket 22 rests against the landing gear 15. In order to be secured thereto, the mounting means 12 additionally has a clamping bar 26 which will be placed on the side opposite of landing gear 15 from that of mounting bracket 22. Clamping bar 26 is then held closely adjacent landing gear 15 by means of a plurality of mounting bolts 27, along with their associated washers 28 and securing nuts 29. Since, on certain trailers, the landing gears 15 may have varying dimensions, the mounting means 12 are provided with an adjustment mechanism for mounting the securement device to the landing gear. The adjustment mechanism would comprise a plurality of holes 31 in clamping bar 26 and mounting bracket 22, so at least one of the mounting bolts 27 could be spaced along the bracket 22 and bar 26 to take into account the differences of dimensions in the various landing gears.

At the termination end 24, the strap housing and winding mechanism support 32 is suitably secured thereto by any number of ways, but preferably by welding the housing to the termination end. The important aspect of the mounting arrangement is that the strap housing 32 is fixedly supported by the termination end 24 for the intended use of securing the dunnage by the high tensile strength nylon securing strap 14. As will be better seen by referring to FIG. 1, winding mechanism 13 includes the strap housing 32, the hook pivoting support member 33, the pawl 34, ratchet 35 and winding handle 36, along with strap 14.

The purpose of the winding mechanism 13 is to safely effect the securement of the dunnage 19 to the landing gear 15. This is accomplished by extending the securing strap 14 from the rolled up position within the winding mechanism 13, as is shown in FIG. 1. If the user extends the securing strap 14 a sufficient distance to wrap around the dunnage 19, such as shown in FIG. 2, the securing strap hook 37 will be engaged in the eye hook fixture 38 of the hook pivoting support member 33. The securing strap 14 will then encompass the entire dunnage materials 19 preparatory to firmly securing the dunnage to the landing gear 15. As can be seen in FIGS. 3A and 3B, there are typically two (2) dunnage securement devices 11, one being attached to each landing gear 15 of the flatbed trailer. While it is not necessary that there be two (2) securement devices for each trailer, it is logical to assume that such would be true in order to maintain the dunnage bundle firmly against both landing gears 15.

Once the securing strap 14 is wrapped around the dunnage 19 and the securing hook 37 is attached to the eye hook 38 in the manner shown in FIG. 2, the user will then grasp the handle grip 39 and rotate the winding handle 36 in a clockwise direction so that the securing strap 14 will be wound upon the strap roll 41, thereby tightening the securing strap 14 around the dunnage 19. As is common in a pawl and ratchet mechanism, the pawl 34 will engage the ratchet 35 to prevent a backward counter-clockwise motion of the winding handle 36 and to maintain a tight relationship of the securing strap 14 around the dunnage.

Inasmuch as the amount of dunnage may vary from load to load, the hook pivoting support member 33 is pivotally connected to the strap housing 32 by means of pivot pin 42 in order to allow the support member 33 a limited pivot range to allow for various hook engagement relationships between the strap 37 and the eye hook 38. If there is a small dunnage load, then the support member 33 would lie essentially in a parallel plane to the strap housing 32. However, if the dunnage load is substantial then the securing strap 14 will wrap around the dunnage load and will approach the eye hook from a relatively high angle to engage the eye hook 38 much in the manner as shown in FIG. 2.

In order to allow a safety factor in the securement of the dunnage 19, a resilient compression spring means 43 is placed in conjunction with the eye hook shaft 44 and retained thereon by the retainer washer 45.

Frequently, when tractor trailers move over the open road and, especially if moving over rough roads, the dunnage tends to settle and reposition itself within the stack and, at times, will have the tension upon the securing strap 14 lessened to some degree which might cause a dangerous condition should the dunnage become loose enough within the stack to be dislodged along the roadway. Therefore, the resilient spring means 43 acts as a tensioning safety mechanism to keep tension on the dunnage to keep the dunnage tight against the landing gear 15 by maintaining tension on the securing strap 14 during transit over the roadway. Maintaining adjustable tension on strap 14 is something that the prior art rope and chain mechanisms could not accomplish.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A dunnage securement device comprising:
    a mounting means comprising a mounting bracket,
    a winding means connected to the mounting bracket and having a housing,
    a ratcheting mechanism mounted on the winding means housing,
    a securement strap having a proximal end and a distal end, the proximal end being attached to the ratcheting mechanism and the distal end having a hook attached thereto,
    a pivoting hook support member pivotally attached to the winding means housing,
    an eye hook fixture resiliently attached to the pivoting hook support member to receive the strap hook at selective times, and
    a resilient spring mounted to the eye hook fixture to bias the eye hook fixture to the pivoting hook support member for reciprocative movement with respect to the pivoting hook support member.

2. A dunnage securement device as claimed in claim 1, wherein the eye hook fixture has a shaft reciprocatively mounted within the pivoting hook support member, the resilient spring being a compression spring mounted around the eye hook fixture shaft.

3. A dunnage securement device as claimed in claim 2, wherein the ratcheting mechanism is mounted on the winding means housing, a winding handle being connected to the ratcheting mechanism.

4. A dunnage securement device as claimed in claim 3, wherein the ratcheting mechanism comprises a pawl and ratchet.

5. A dunnage securement device as claimed in claim 4, wherein the winding means housing is of U-shaped configuration.

6. A dunnage securement device as claimed in claim 5, wherein the proximal end of the securement strap is enclosed within the U-shaped winding means housing.

7. A dunnage securement device as claimed in claim 1, wherein the mounting bracket has an attachment end, a termination end and a bracket offset portion interconnecting the attachment end to the termination end.

8. A dunnage securement device as claimed in claim 7, wherein a clamping bar is spatially disposed from the mounting bracket for maintaining the mounting bracket to a holding member.

9. A dunnage securement device as claimed in claim 8, wherein the attachment end of the mounting bracket has a plurality of fastening apertures therein, the clamping bar having a plurality of fastening apertures therein, a plurality of fasteners positioned in the fastening apertures of both the attachment end of the mounting bracket and in the fastening apertures of the clamping bar to mount the securement device to the holding member.

10. A dunnage securement device comprising:

- a mounting means comprising a mounting bracket, the mounting bracket has an attachment end, a termination end and a bracket offset portion interconnecting the attachment end to the termination end,
- a clamping bar spatially disposed from the mounting bracket for maintaining the mounting bracket to a holding member, the attachment end of the mounting bracket has a plurality of fastening apertures therein, the clamping bar having a plurality of fastening apertures therein, a plurality of fasteners positioned in the fastening apertures of both the attachment end of the mounting bracket and in the fastening apertures of the clamping bar to mount the securement device to the holding member,
- a winding means connected to the mounting bracket and having a housing of U-shaped configuration,
- a ratcheting mechanism mounted on the winding means housing, wherein the ratcheting mechanism comprises a pawl and ratchet mounted on the winding means housing,
- a securement strap having a proximal end and a distal end, the proximal end being attached to the ratcheting mechanism and the distal end having a hook attached thereto,
- the proximal end of the securement strap is enclosed within the U-shaped winding means housing,
- a pivoting hook support member pivotally attached to the winding means housing,
- an eye hook fixture resiliently attached to the pivoting hook support member to receive the strap hook at selective times,
- a resilient spring mounted to the eye hook fixture to bias the eye hook fixture to the pivoting hook support member for reciprocative movement with respect to the pivoting hook support member, and
- the eye hook fixture has a shaft reciprocatively mounted within the pivoting hook support member, the resilient spring being a compression spring mounted around the eye hook fixture shaft.

* * * * *